Patented Oct. 27, 1931

1,829,712

UNITED STATES PATENT OFFICE

LEE HINCHMAN CLARK, OF ROSEMONT, PENNSYLVANIA, ASSIGNOR TO THE SHARPLES SPECIALTY COMPANY, OF PHILADELPHIA, PENNSYLVANIA, A CORPORATION OF DELAWARE

PROCESS FOR PURIFYING DIELECTRIC LIQUIDS

No Drawing.        Application filed March 5, 1925.   Serial No. 13,373.

My invention is an improved method of purifying and rehabilitating liquids, such as oil, used as dielectrics surrounding the contact members of circuit breakers, switches and the like. The arcing incident to the operation of such circuit breakers and switches, particularly on high tension lines, results in the formation of, and the contamination of the dielectric by, minute dispersed particles of carbon and other impurities, and in the decomposition of constituents of the insulating oil, with resultant lowering of its resistance to emulsification with water introduced therein by condensation of atmospheric moisture from the air drawn in when the apparatus "breathes", or otherwise. These impurities cause a dangerous reduction in the dielectric strength of the oil and the effectiveness thereof as an arc quenching medium, and the water of condensation or other moisture introduced into the casing remains suspended more or less permanently in the oil, instead of settling readily therefrom to the bottom of the casing below the electrodes, where its capacity for harm is minimized.

I have discovered that by first removing from the contaminated oil the carbonaceous impurities, and preferably the sensible moisture, or the bulk thereof, the reaction or decomposition products resulting from arcing and tending to promote emulsification may be readily extracted by adsorption and the oil purified and its original properties restored rapidly and without waste. If desired, the oil to be treated may be subjected to a preliminary drying, as by centrifugation, for the removal of free water.

The carbonaceous contaminating particles suspended in the oil are so finely divided that they are normally not susceptible, while dispersed in the oil, to the action of centrifugal force, or of subsidence or filtration through usual filter media, such as cloth, and when concentrated by filtration through blotter filters as commonly practiced they form a film or layer almost impervious to the passage of liquid therethrough, and necessitating for filtering operations the use of pressures so high as to risk disrupting the filter sheets. Moreover, the carbonaceous particles have an affinity for clarifying media so much greater than have the emulsifying agents that the latter cannot be adsorbed in the presence of the former without the use of an excessive amount of clarifier, with a resultant excessive loss of oil and unnecessary cost.

In effecting the removal of the suspended carbonaceous particles and sensible moisture, I prefer to add to the contaminated oil a clarifier or substance such as diatomaceous earth, fuller's earth, or the like, with which the particles of suspended matter or moisture will mechanically combine, as by enmeshment, adsorption or adhesion. A very small percentage of such clarifier is sufficient to render porous the film formed by the precipitated carbonaceous particles if the oil is filter pressed, with a resultant greatly increased output from the press; to stratify the suspended particles if the oil is centrifuged; or to carry down the particles if subsidence is relied upon to effect separation.

The oil freed from its suspended impurities is treated with an adsorptive material for the removal of the reaction products tending to promote emulsification, and which, due to their lesser affinities for adsorptive material than is possessed by the carbon and water, cannot be adsorbed while the latter are present in substantial quantities without the use of such a large amount of adsorptive material as results in wastage of a large part of the oil.

I have further found that the carbon with which the oil is contaminated is positively charged, and that if a negatively charged media is added to the oil the carbon will combine therewith completely and permanently, so that it is unnecessary to employ a filter media having a mesh or pores impervious to carbon particles as the carbon bearing substance may be eliminated by the use of a usual filter cloth.

As an example of the practical application of my invention, there was added to dielectric oil, badly contaminated by circuit breaker use, one quarter of one percent by weight of kieselguhr, and the oil so treated was passed through a filter press, equipped with blotter paper, through which the oil passed at a rate three times as fast as the rate of passage of oil without the clarifier. To the clarified oil, from which the carbon and sensible moisture had been removed, there was added one quarter of one percent by weight of finely divided fuller's earth, and the product was again filter pressed for the removal of the fuller's earth and its adsorbed decomposition products tending to promote emulsification. The oil so treated was of satisfactory dielectric strength, and had a greater resistance to emulsification than new oil of the same grade; and tests showed capacity of the product for service equal to that obtained from new oil.

In another demonstration of my process, there was added to dielectric oil, badly contaminated with carbon as a result of exposure to arcing, negatively charged shredded blotter filter paper or pulp. The carbon was adsorbed by the paper to which it permanently adhered, and the shredded blotting paper was then filtered out by the use of filter cloth. The clarified oil was then treated, for the removal of decomposition products promoting emulsification, by the addition thereto of adsorptive material such as fuller's earth or pulverized silica gel and its elimination by filter pressing, centrifuging or subsidence.

By my process I am enabled to render fit for reuse large volumes of contaminated oil by the use of minute quantities of inexpensive reagents or clarifiers; to greatly increase the capacity of the apparatus used; to avoid frequent changes or rupturing of the filter media, and to produce a superior product.

Having described my invention, I claim:

1. The process for preparing for use as a dielectric, oil contaminated during use as a dielectric by carbonaceous particles and soluble products of decomposition tending to promote emulsification, comprising removing such particles from the oil by adding to the oil in divided form carbon-adherent material, and then separately adsorbing in adsorptive earth the decomposition products in the oil.

2. The process for preparing for use as a dielectric, oil contaminated during use as a dielectric by suspended water, carbonaceous particles and soluble products of decomposition tending to promote emulsification, comprising removing such particles and water from the oil by adding water-absorbing carbon-adherent material in divided form to the oil, then separately adsorbing from the oil in adsorbent earth the decomposition products in the oil.

3. The process for preparing for use as a dielectric, oil contaminated during use as a dielectric by carbonaceous particles and soluble products of decomposition tending to promote emulsification, comprising adding in divided form a water-absorbent carbon-adherent solid material to the oil, removing from the oil the added solids with adhering carbon and absorbed water, then separately adsorbing the decomposition products in adsorptive earth.

4. The process for preparing for use as a dielectric, oil contaminated by carbonaceous particles and soluble products of decomposition tending to promote emulsification, comprising adding to the oil finely divided solids that render pervious the otherwise impervious layer of solids formed by precipitation of said particles, filtering the carbon particles and added solids from the oil, then separably adsorbing the decomposition products in adsorptive earth.

5. The process for preparing for use as a dielectric, oil contaminated by carbonaceous particles and soluble products of decomposition tending to promote emulsification, comprising adding to the oil finely divided water absorbent solids that render pervious the otherwise impervious layer of solids formed by precipitation of said particles, filtering the carbon particles and added solids from the oil, then separably adsorbing the decomposition products in adsorptive earth.

6. The process for preparing for use as a dielectric, oil contaminated during use as a dielectric by carbonaceous particles and soluble products of decomposition tending to promote emulsification, comprising adding in divided form a carbon-adherent material to the oil, then filtering out said material with adhering carbon, then adsorbing emulsifying impurities in the oil in adsorbent earth.

7. The process for preparing for use as a dielectric, oil contaminated with water and by the formation therein of solid particles and soluble products of decomposition during use as a dielectric, comprising adding to the oil water-absorbent solid material capable of combining mechanically with the solid particles, removing the added solids with absorbed water and mechanically combined solid impurities, then adsorbing from the oil in adsorbent earth the soluble products of decomposition in the oil.

8. The process for preparing for use as a dielectric, oil contaminated by carbonaceous particles and soluble products of decomposition tending to promote emulsification, comprising adding to the oil in divided form a carbon-adherent solid having an electric charge opposite to that of the impurities of the oil, removing from the oil the added solid and adhering solid impurities, then adsorbing from the oil in adsorptive earth the soluble emulsion-promoting impurities.

9. The process for preparing for use as a dielectric, oil contaminated by suspended finely-divided solid particles and with soluble products tending to promote emulsification, comprising adding to the oil in divided form a carbon-adherent solid having an electric charge opposite to that of the suspended solid particles in the oil, removing from the oil the added solid and adhering solid particles, then adsorbing from the oil in adsorptive earth the soluble emulsion-promoting impurities.

Signed at Philadelphia, in the county of Philadelphia, and State of Pennsylvania, this 2nd day of March, 1925.

LEE HINCHMAN CLARK.